(12) United States Patent
Ackermann et al.

(10) Patent No.: US 10,502,135 B2
(45) Date of Patent: Dec. 10, 2019

(54) BUFFER SYSTEM FOR COMMUNICATING ONE OR MORE BUFFER SUPPLY AIRS THROUGHOUT A GAS TURBINE ENGINE

(75) Inventors: William K. Ackermann, East Hartford, CT (US); Philip S. Stripinis, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 709 days.

(21) Appl. No.: 13/366,445

(22) Filed: Feb. 6, 2012

(65) Prior Publication Data
US 2013/0192248 A1  Aug. 1, 2013

Related U.S. Application Data

(60) Provisional application No. 61/592,918, filed on Jan. 31, 2012.

(51) Int. Cl.
| | |
|---|---|
| *F02C 7/06* | (2006.01) |
| *F01D 25/12* | (2006.01) |
| *B64D 15/04* | (2006.01) |
| *F02C 7/047* | (2006.01) |
| *F02C 7/141* | (2006.01) |

(52) U.S. Cl.
CPC ............. *F02C 7/047* (2013.01); *B64D 15/04* (2013.01); *F01D 25/125* (2013.01); *F02C 7/06* (2013.01); *F02C 7/141* (2013.01); *Y02T 50/675* (2013.01)

(58) Field of Classification Search
CPC ... F02C 6/08; F02C 7/047; F02C 9/18; B64D 15/04; B64D 15/22; B64D 2033/0233; F01D 25/02; F01D 25/125

USPC .......... 60/226.1, 226.3, 792, 39.162, 39.163, 60/785, 782, 39.091, 39.093, 795; 244/134 R, 134 B, 134 C

See application file for complete search history.

(56) References Cited

U.S. PATENT DOCUMENTS

| | | | |
|---|---|---|---|
| 2,584,899 A | 2/1952 | McLeod | |
| 2,636,665 A | 4/1953 | Lombard | |
| 3,287,906 A | 11/1966 | McCormick | |
| 3,754,484 A | 8/1973 | Roberts | |
| 3,844,110 A | 10/1974 | Widlansky et al. | |
| 3,892,358 A | 7/1975 | Gisslen | |
| 3,925,979 A * | 12/1975 | Ziegler | 60/785 |
| 3,940,092 A | 2/1976 | Farris | |

(Continued)

FOREIGN PATENT DOCUMENTS

| | | |
|---|---|---|
| GB | 1386481 | 3/1975 |
| GB | 1516041 | 6/1978 |

(Continued)

OTHER PUBLICATIONS

International Search Report and Written Opinion for International Application No. PCT/US2013/021636 dated Sep. 18, 2013.

(Continued)

*Primary Examiner* — Andrew H Nguyen
(74) *Attorney, Agent, or Firm* — Carlson, Gaskey & Olds

(57) ABSTRACT

A gas turbine engine includes a buffer system. The buffer system can include a first bleed air supply and a conditioning device that conditions the first bleed air supply to render the buffer supply air at an acceptable temperature to anti-ice the hardware of said fan section.

16 Claims, 5 Drawing Sheets

(56) References Cited

U.S. PATENT DOCUMENTS

| | | | |
|---|---|---|---|
| 4,130,872 A | 12/1978 | Harloff | |
| 4,497,172 A | 2/1985 | Smith | |
| 4,502,274 A | 3/1985 | Girault | |
| 4,574,584 A | 3/1986 | Hovan | |
| 4,576,547 A | 3/1986 | Weiner et al. | |
| 4,653,267 A | 3/1987 | Brodell et al. | |
| 4,709,545 A | 12/1987 | Stevens et al. | |
| 4,782,658 A | 11/1988 | Perry | |
| 4,852,343 A * | 8/1989 | Norris | F02C 7/047 60/779 |
| 4,863,354 A | 9/1989 | Asselin et al. | |
| 5,072,781 A * | 12/1991 | Goodman | 165/300 |
| 5,305,616 A | 4/1994 | Coffinberry | |
| 5,311,734 A * | 5/1994 | Pope et al. | 60/782 |
| 5,385,012 A | 1/1995 | Rowe | |
| 5,423,174 A | 6/1995 | Mouton | |
| 5,433,674 A | 7/1995 | Sheridan et al. | |
| 5,447,411 A | 9/1995 | Curley et al. | |
| 5,472,313 A | 12/1995 | Quinones et al. | |
| 5,482,431 A | 1/1996 | Taylor | |
| 5,524,847 A | 6/1996 | Brodell et al. | |
| 5,573,378 A * | 11/1996 | Barcza | B64C 11/14 411/175 |
| 5,611,661 A * | 3/1997 | Jenkinson | F01D 25/183 184/6.11 |
| 5,685,158 A | 11/1997 | Lenahan et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,035,627 A | 3/2000 | Liu | |
| 6,223,616 B1 | 5/2001 | Sheridan | |
| 6,318,070 B1 | 11/2001 | Rey et al. | |
| 6,516,618 B1 | 2/2003 | Bock | |
| 6,520,742 B1 | 2/2003 | Forrester et al. | |
| 6,550,253 B2 | 4/2003 | Mortzheim et al. | |
| 6,732,502 B2 * | 5/2004 | Seda et al. | 60/226.1 |
| 6,814,541 B2 | 11/2004 | Evans et al. | |
| 7,021,042 B2 | 4/2006 | Law | |
| 7,090,466 B2 | 8/2006 | Honkomp et al. | |
| 7,147,440 B2 | 12/2006 | Benjamin et al. | |
| 7,159,402 B2 | 1/2007 | Hein et al. | |
| 7,287,384 B2 | 10/2007 | Fish et al. | |
| 7,377,098 B2 | 5/2008 | Walker et al. | |
| 7,448,221 B2 | 11/2008 | Suciu et al. | |
| 7,591,754 B2 | 9/2009 | Duong et al. | |
| 7,658,077 B2 * | 2/2010 | Earith et al. | 60/779 |
| 7,824,305 B2 | 11/2010 | Duong et al. | |
| 7,926,260 B2 | 4/2011 | Sheridan et al. | |
| 8,061,657 B2 | 11/2011 | Rocklin et al. | |
| 8,205,432 B2 | 6/2012 | Sheridan | |
| 2007/0220899 A1 | 9/2007 | Earith Thomas et al. | |
| 2008/0115503 A1 | 5/2008 | Vasquez et al. | |
| 2009/0097967 A1 | 4/2009 | Smith et al. | |
| 2009/0104020 A1 | 4/2009 | Roush et al. | |
| 2010/0092116 A1 | 4/2010 | Franconi | |
| 2010/0148396 A1 | 6/2010 | Xie et al. | |
| 2010/0162683 A1 * | 7/2010 | Grabowski et al. | 60/226.3 |
| 2010/0164234 A1 * | 7/2010 | Bowman et al. | 290/1 R |
| 2010/0170262 A1 * | 7/2010 | Kaslusky et al. | 60/778 |
| 2010/0236216 A1 | 9/2010 | Winter et al. | |
| 2010/0314877 A1 | 12/2010 | Finney | |
| 2010/0331139 A1 | 12/2010 | McCune | |
| 2011/0047959 A1 | 3/2011 | DiBenedetto | |
| 2011/0203293 A1 | 8/2011 | Glahn | |
| 2012/0210721 A1 * | 8/2012 | Olivarez | F02C 6/08 60/772 |
| 2013/0202403 A1 | 8/2013 | Morin et al. | |

FOREIGN PATENT DOCUMENTS

| | | |
|---|---|---|
| GB | 2041090 | 9/1980 |
| WO | 2007038674 | 4/2007 |

OTHER PUBLICATIONS

Aero-Engine Design: From State of the Art Turbofans Towards Innovative Architectures, Mar. 3-7, 2008; von Karman Institute for Fluid Dynamics, Chaussee de Waterloo, 72, B-1640 Rhode Saint Genese—Belgium; Lecture Series Mar. 2008; ISN0377-8312; 26 pages.

Dr. Gunter Wilfert, MTU Aero Engines, Germany; Geared Fan; XP003035510; 76 pages.

Crichton, et al.; Design and Operation for Ultra Low Noise Take-Off; 45th AIAA Aerospace Sciences Meeting and Exhibit; Jan. 8-11, 2007, Reno, Nevada; AIAA 2007-456; 18 pages.

Malzacher, et al.; Aerodesign and Testing of an Aeromechanically Highly Loaded LP Turbine; Journal of Turbomachinery, Oct. 2006, vol. 128, pp. 643-649; http://turbomachinery.asmedigitalcollection.asme.org.

Wilfert, et al.; Clean-Validation of a High Efficient Low NOx Core, A GTF High Speed Turbine and an Integration of a Recuperator in an Environment Friendly Engine Concept; 41st AIAA/ASME/SAE/ASEE Joint Propulsion Conference & Exhibit, Jul. 10-13, 2005, Tuscon Arizona; AIAA 2005-4195; pp. 1-11.

Wilfert, et al.; Clean-Validation of a GTF High Speed Turbine and Integration of Heat Exchanger Technology in an Environmental Friendly Engine Concept; ISABE—2005-1156; pp. 1-8.

Riegler, et al.; The Geared Turbofan Technology—Opportunities, Challenges and Readiness Status; 10 pages.

Extended European Search Report for Application No. EP 13 77 5763 dated Aug. 26, 2015.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

(56) References Cited

OTHER PUBLICATIONS

Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.

* cited by examiner

BUFFER SYSTEM FOR COMMUNICATING ONE OR MORE BUFFER SUPPLY AIRS THROUGHOUT A GAS TURBINE ENGINE

CROSS-REFERENCE TO RELATED APPLICATIONS

This application claims priority to U.S. Provisional Application No. 61/592,918 which was filed on Jan. 31, 2012.

BACKGROUND

This disclosure relates to a gas turbine engine, and more particularly to a buffer system that can communicate a buffer supply air to multiple portions of the gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine modes.

During flight, ice can form on portions of a fan section of the engine, such as on a spinner or nosecone of an upstream portion of the fan section. Ice build-up on the spinner, nosecone or other hardware can result in reduced engine efficiency and/or damage to downstream components caused by broken pieces of ice entering the core flow path of the engine.

SUMMARY

A gas turbine engine includes a buffer system. The buffer system can include a first bleed air supply and a conditioning device that conditions the first bleed air supply to render the buffer supply air at an acceptable temperature to anti-ice the hardware of said fan section.

In a further embodiment of the foregoing gas turbine engine embodiment, the hardware includes a spinner.

In a further embodiment of either of the foregoing gas turbine engine embodiments, the buffer system communicates the buffer supply air to an interior portion of the spinner.

In a further embodiment of any of the foregoing gas turbine engine embodiments, a passageway can communicate the buffer supply air from the buffer system to the interior portion.

In a further embodiment of any of the foregoing gas turbine engine embodiments, the hardware can include a static nosecone.

In a further embodiment of any of the foregoing gas turbine engine embodiments, the first bleed air supply can be sourced from a stage of either a fan section or a compressor section.

In a further embodiment of any of the foregoing gas turbine engine embodiments, the conditioning device can include a heat exchanger.

In a further embodiment of any of the foregoing gas turbine engine embodiments, the gas turbine engine can include a geared turbofan engine.

In a further embodiment of any of the foregoing gas turbine engine embodiments, the buffer system can include a second bleed air supply and a valve that selects between the first bleed air supply and the second bleed air supply to communicate the buffer supply air.

In a further embodiment of any of the foregoing gas turbine engine embodiments, the buffer system can include a controller that selectively operates the conditioning device.

In a further embodiment of any of the foregoing gas turbine engine embodiments, the buffer system communicates a buffer supply air to hardware of a fan section of the gas turbine engine.

In another exemplary embodiment, a gas turbine engine includes a fan section and a compressor section in fluid communication with the fan section. A combustor is in fluid communication with the compressor section, a turbine section is in fluid communication with the combustor, and at least one shaft interconnects the portion of the compressor section and the turbine section. A buffer system can communicate a buffer supply air to at least a spinner of the fan section to anti-ice the spinner.

In a further embodiment of the foregoing gas turbine engine embodiment, the buffer system can include a first bleed air supply and a conditioning device that conditions the first bleed air supply to render the buffer supply air.

In a further embodiment of either of the foregoing gas turbine engine embodiments, the buffer system can include a first bleed air supply, a second bleed air supply, a valve that selects between the first bleed air supply and the second bleed air supply, and a conditioning device.

In a further embodiment of either of the foregoing gas turbine engine embodiments, a geared architecture can drive the fan section at a lower speed than the compressor section.

In a further embodiment of any of the foregoing gas turbine engine embodiments, the gas turbine engine can include a high bypass geared aircraft engine having a bypass ratio of greater than about six (6).

In yet another exemplary embodiment, a method of cooling a portion of a gas turbine engine can include communicating a buffer supply air to at least one bearing structure, the bearing structure defining a bearing compartment. The buffer supply air can also be communicated from the bearing compartment to anti-ice hardware of a fan section of the gas turbine engine.

In a further embodiment of the foregoing method embodiment, the hardware of the fan section includes a spinner.

In a further embodiment of any of the foregoing method embodiments, a bleed air supply is cooled prior to communicating the buffer supply air.

The various features and advantages of this disclosure will become apparent to those skilled in the art from the following detailed description. The drawings that accompany the detailed description can be briefly described as follows.

DETAILED DESCRIPTION

Figure 1:
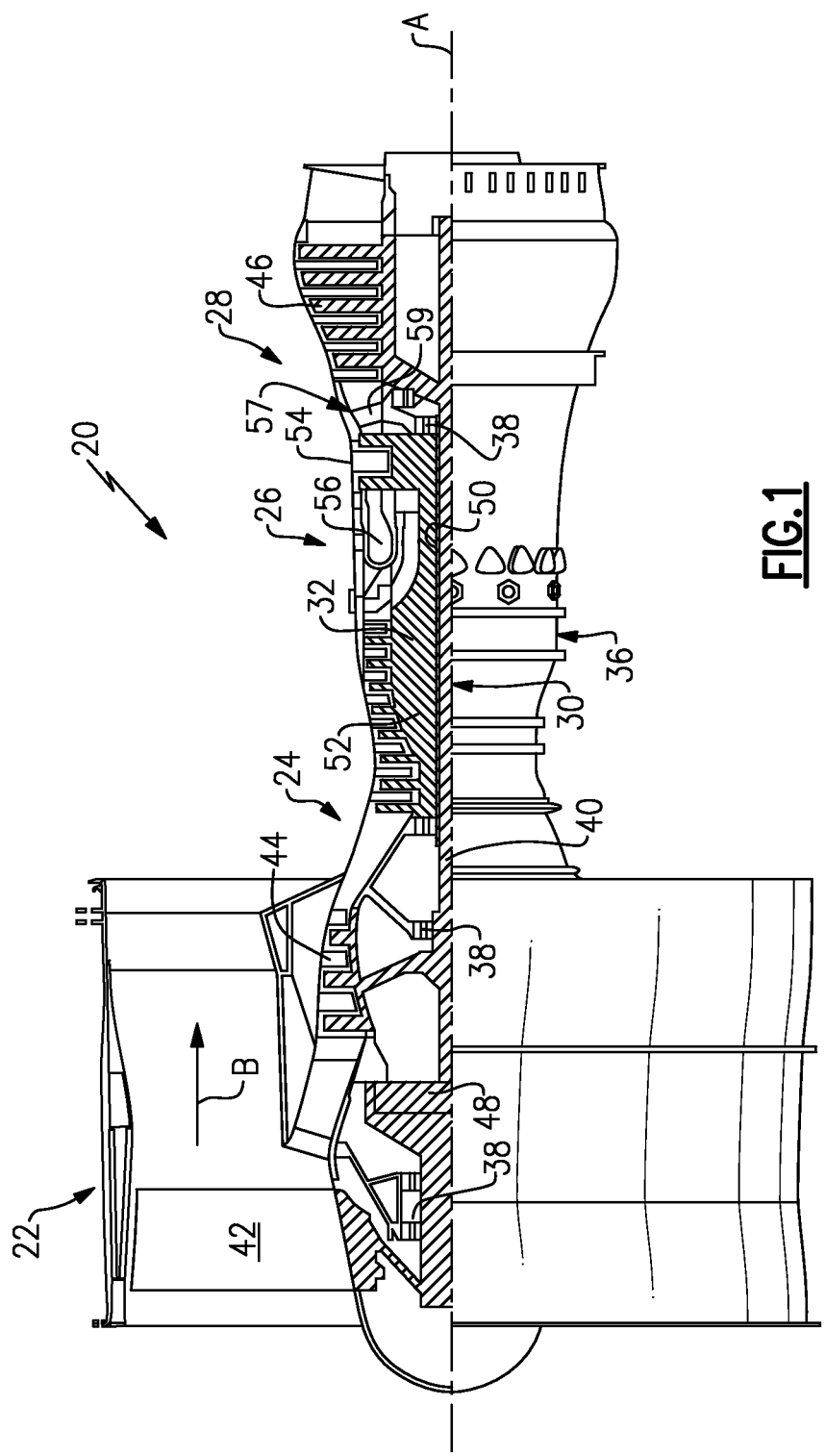
FIG. 1 is a cross-section of a gas turbine engine.

FIG. 1 is a cross-section of a gas turbine engine 20. The gas turbine engine 20 of the exemplary embodiment is a two-spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path while the compressor section 24 drives air along a core flow path for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of turbine engines, including but not limited to three-spool engine architectures and land based applications.

The gas turbine engine 20 generally includes a low speed spool 30 and a high speed spool 32 mounted for rotation about an engine centerline longitudinal axis A relative to an engine static structure 36 via several bearing structures 38. It should be understood that various bearing structures 38 at various locations may alternatively or additionally be provided.

The low speed spool 30 generally includes an inner shaft 40 (i.e., a low shaft) that interconnects a fan 42, a low pressure compressor 44 and a low pressure turbine 46. The inner shaft 40 can be connected to the fan 42 through a geared architecture 48 to drive the fan 42 at a lower speed than the low speed spool 30. The high speed spool 32 includes an outer shaft 50 (i.e., a high shaft) that interconnects a high pressure compressor 52 and a high pressure turbine 54. In this example, the inner shaft 40 and the outer shaft 50 are supported at a plurality of axial locations by bearing structures 38 that are positioned within the engine static structure 36.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 can support one or more bearing structures 38 in the turbine section 28. The inner shaft 40 and the outer shaft 50 are concentric and rotate via the bearing structures 38 about the engine centerline longitudinal axis A, which is collinear with their longitudinal axes. The inner shaft 40 and the outer shaft 50 can be either co-rotating or counter-rotating with respect to one another.

The core airflow is compressed by the low pressure compressor 44 and the high pressure compressor 52, is mixed with fuel and burned in the combustor 56, and is then expanded over the high pressure turbine 54 and the low pressure turbine 46. The mid-turbine frame 57 includes airfoils 59 which are in the core airflow path. The high pressure turbine 54 and the low pressure turbine 46 rotationally drive the respective low speed spool 30 and the high speed spool 32 in response to the expansion.

In some non-limiting examples, the gas turbine engine 20 is a high-bypass geared aircraft engine. In a further example, the gas turbine engine 20 bypass ratio is greater than about six (6:1). The geared architecture 48 of the example gas turbine engine 20 includes an epicyclic gear train, such as a planetary gear system or other gear system. The example epicyclic gear train has a gear reduction ratio of greater than about 2.3. The geared architecture 48 enables operation of the low speed spool 30 at higher speeds which can increase the operational efficiency of the low pressure compressor 44 and low pressure turbine 46 and render increased pressure in a fewer number of stages.

The low pressure turbine 46 pressure ratio is pressure measured prior to inlet of low pressure turbine 46 as related to the pressure at the outlet of the low pressure turbine 46 of the gas turbine engine 20. In another non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). The geared architecture 48 of yet another embodiment is an epicyclic gear train with a gear reduction ratio of greater than about 2.5:1. It should be understood, however, that the above parameters are only exemplary of one embodiment of a geared architecture engine and that the present disclosure is applicable to other gas turbine engines including direct drive turbofans.

In this embodiment of the example gas turbine engine 20, a significant amount of thrust is provided by a bypass flow B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise. TSFC (Thrust Specific Fuel Consumption) is an industry standard parameter of fuel consumption per unit of thrust.

Fan Pressure Ratio is the pressure ratio across the fan section 22 without the use of a Fan Exit Guide Vane system. The low Fan Pressure Ratio according to one non-limiting embodiment of the example gas turbine engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Figure 2:
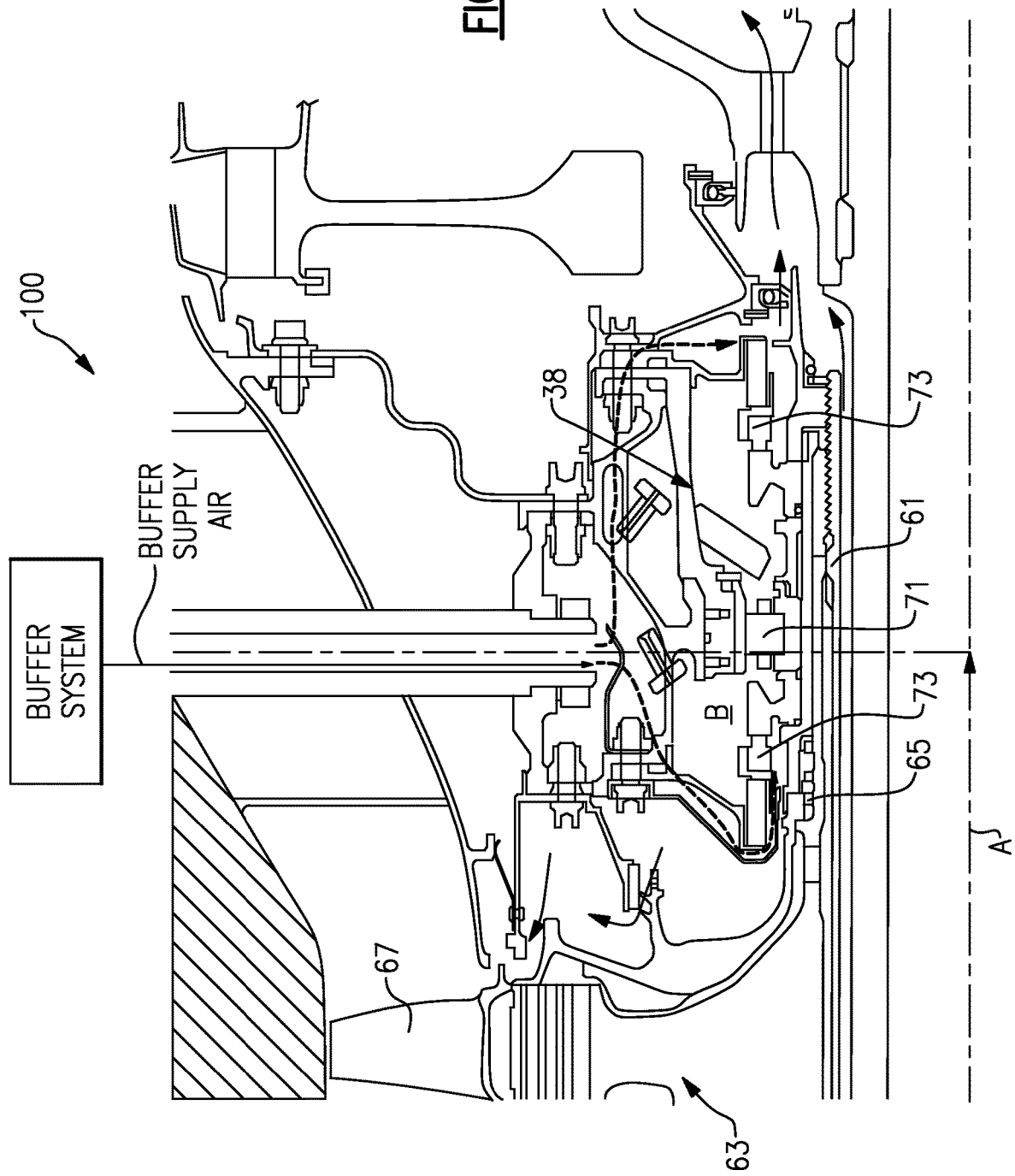
FIG. 2 is a schematic cross-section of a portion of the gas turbine engine.

FIG. 2 illustrates a portion 100 of a gas turbine engine, such as the gas turbine engine 20. The portion 100 can include one or more bearing structures 38. Only one bearing structure 38 is depicted in FIG. 2 to schematically illustrate its features, but this is in no way intended to limit this disclosure.

The bearing structure 38 supports a shaft 61, such as the outer shaft 50, which supports a rotor assembly 63, such as a rotor assembly of the compressor section 24 or the turbine section 28, through a hub 65. In this example, the shaft 61 is a tie shaft that that connects the high pressure compressor 52 to the high pressure turbine 54. The rotor assembly 63 carries at least one airfoil 67 for adding or extracting energy from the core airflow.

The bearing structure 38 defines a bearing compartment B that houses one or more bearings 71. The bearing compartment B contains a lubricant for lubricating (and acting as a cooling medium to) the bearings 71. One or more seals 73 (two shown) contain the lubricant within the bearing compartment B. The seals 73 of the bearing compartment B must be pressurized to prevent the lubricant from leaking out during certain flight conditions, including both steady-state and transient. A buffer system can be used to communicate a buffer supply air to the bearing compartment B in order to provide adequate pressurization of the seals 73 without exceeding material and/or lubricant temperature limitations. Example buffer systems that can be used for this and other purposes, including spinner anti-icing, are detailed below.

Figure 3:
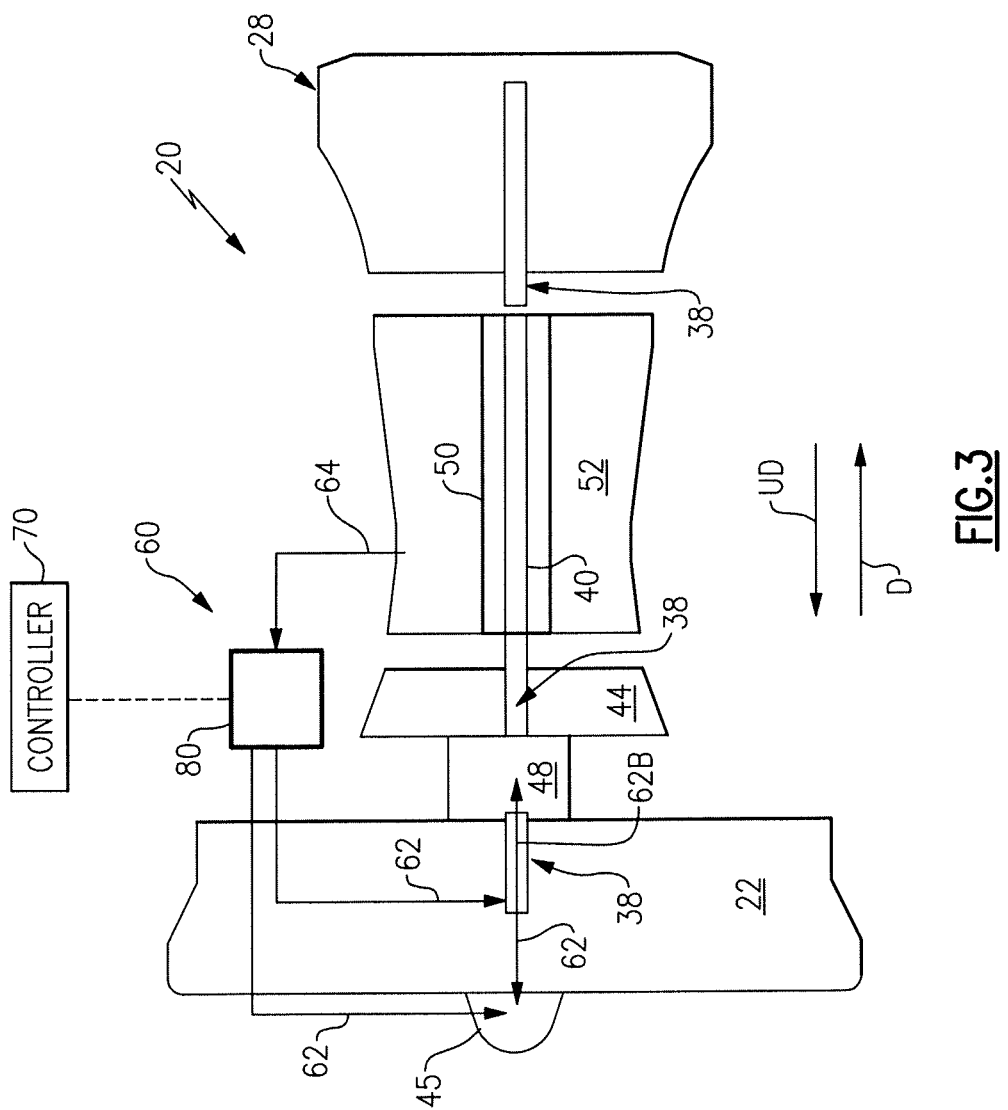
FIG. 3 is a schematic embodiment of a buffer system of the gas turbine engine.

FIG. 3 illustrates an example buffer system 60 that can communicate a buffer supply air 62 to a first portion of the gas turbine engine 20, such as to one or more bearing structures 38 (shown schematically in FIG. 3) and a second portion of the gas turbine engine, such as hardware of the fan section 22. For example, the buffer supply air 62 can be communicated to a spinner 45 or static nosecone of the fan section 22. The buffer supply air 62 pressurizes (by surrounding with cool air) the outside of the bearing compartment(s) of one or more bearing structure 38 to maintain sufficient pressure differential between the buffer cavity and the bearing compartment cavity and maintain bearing compartment seal leakage inflow at an acceptable temperature. The buffer supply air 62 can also be used to anti-ice the spinner 45 or other fan section 22 hardware during flight conditions where icing is possible.

The buffer system 60 may include a first bleed air supply 64 and a conditioning device 80. The first bleed air supply 64 can be sourced from the fan section 22, the low pressure compressor 44 or the high pressure compressor 52. In the illustrated non-limiting example, the first bleed air supply 64 is sourced from a middle stage of the high pressure compressor 52. The conditioning device 80 can condition the first bleed air supply 64 to render a buffer supply air 62 having an acceptable temperature for buffering the environments surrounding the bearing structures 38 and for anti-icing the spinner 45 or other fan section 22 hardware. In other words, the conditioning device 80 prepares a buffer supply air 62 of a temperature that is adequate to both cool a bearing structure 38 and provide enough heat to anti-ice the spinner 45 without over-temping the spinner 45 or any other fan section 22 hardware (i.e., the buffer supply air 62 temperature is below the hardware temperature limits). The conditioning device 80 could include an air-to-air heat exchanger, a fuel-to-air heat exchanger, or any other suitable heater exchanger.

In one embodiment, the buffer supply air 62 may be communicated from the conditioning device 80 to a bearing structure 38 and then in an axially upstream direction UD to anti-ice the spinner 45. Alternatively, separate buffer supply airs 62 could be communicated to the bearing structures 38 and the spinner 45. A portion 62B of the buffer supply air 62 can also be communicated in a downstream direction D to condition other portions of the gas turbine engine 20. Although shown schematically, the buffer supply air 62 can be communicated between the conditioning device 80, the bearing structures 38 and the spinner 45 via buffer tubing, conduits, or other passageways. Such tubing, conduits and/or passageways could be routed throughout the gas turbine engine 20. The type, location and configuration of such tubing, conduits and/or passageways are not intended to limit this disclosure.

Figure 4:
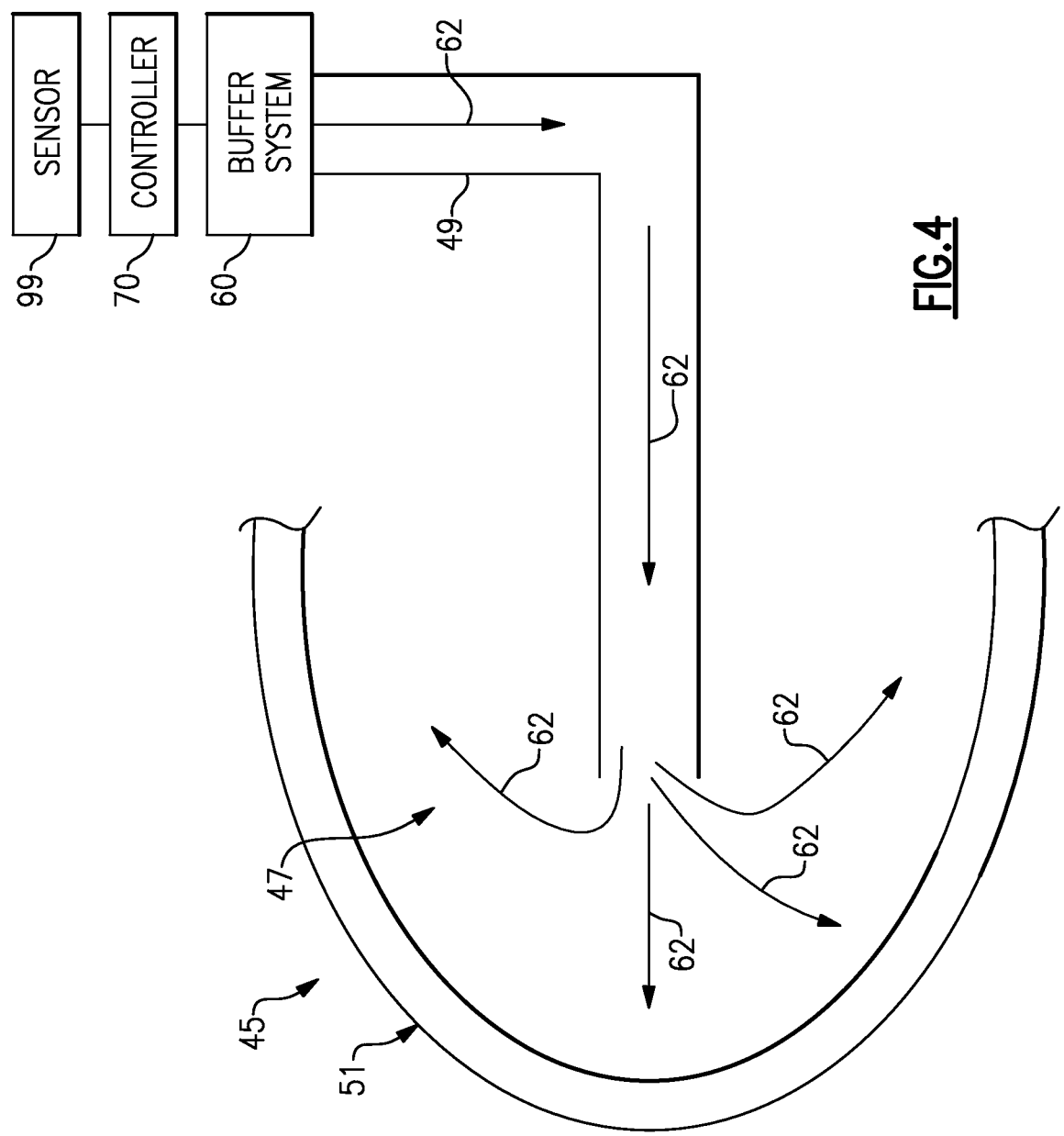
FIG. 4 illustrates additional aspects of the buffer system of FIG. 3.

Referring to FIG. 4, the buffer supply air 62 may be communicated to an interior portion 47 of the spinner 45. It should be understood that FIG. 4 is not shown to the scale it would be in practice but is exaggerated to better illustrate the various features of the buffer system 60. A passageway 49 that is in fluid communication with the buffer system 60 can be positioned to direct the buffer supply air 62 into interior portion 47 to anti-ice an exterior surface 51 of the spinner 45.

In the embodiments shown in FIGS. 3 and 4, the buffer system 60 includes a controller 70. The controller 70 is programmed to command the communication of buffer supply air 62 to the interior portion 47 of the spinner 45 for anti-icing purposes in response to detecting a flight condition where ice build-up at the spinner 45 is possible and/or provide adequate differential pressures across the primary bearing compartment seals at all engine operating flight conditions. Spinner anti-icing is generally required below an altitude of 22,000 feet (6,705.6 meters), especially on cold days, although it can be provided at other flight conditions. The controller 70 could also generate a signal to command operation of the conditioning device 80 for controlling the temperature of the buffer supply air 62 for different flight conditions (See FIG. 3).

The buffer system 60 can further include a sensor 99 for detecting flight conditions of the gas turbine engine 20. The sensor 99 and the controller 70 can be programmed to detect any flight condition. Also, the sensor 99 can be replaced by any control associated with the gas turbine engine 20 or an associated aircraft. Also, although shown as a separate feature, the controller functionality could be incorporated into another portion of the buffer system 60, such as the conditioning device 80.

Figure 5:
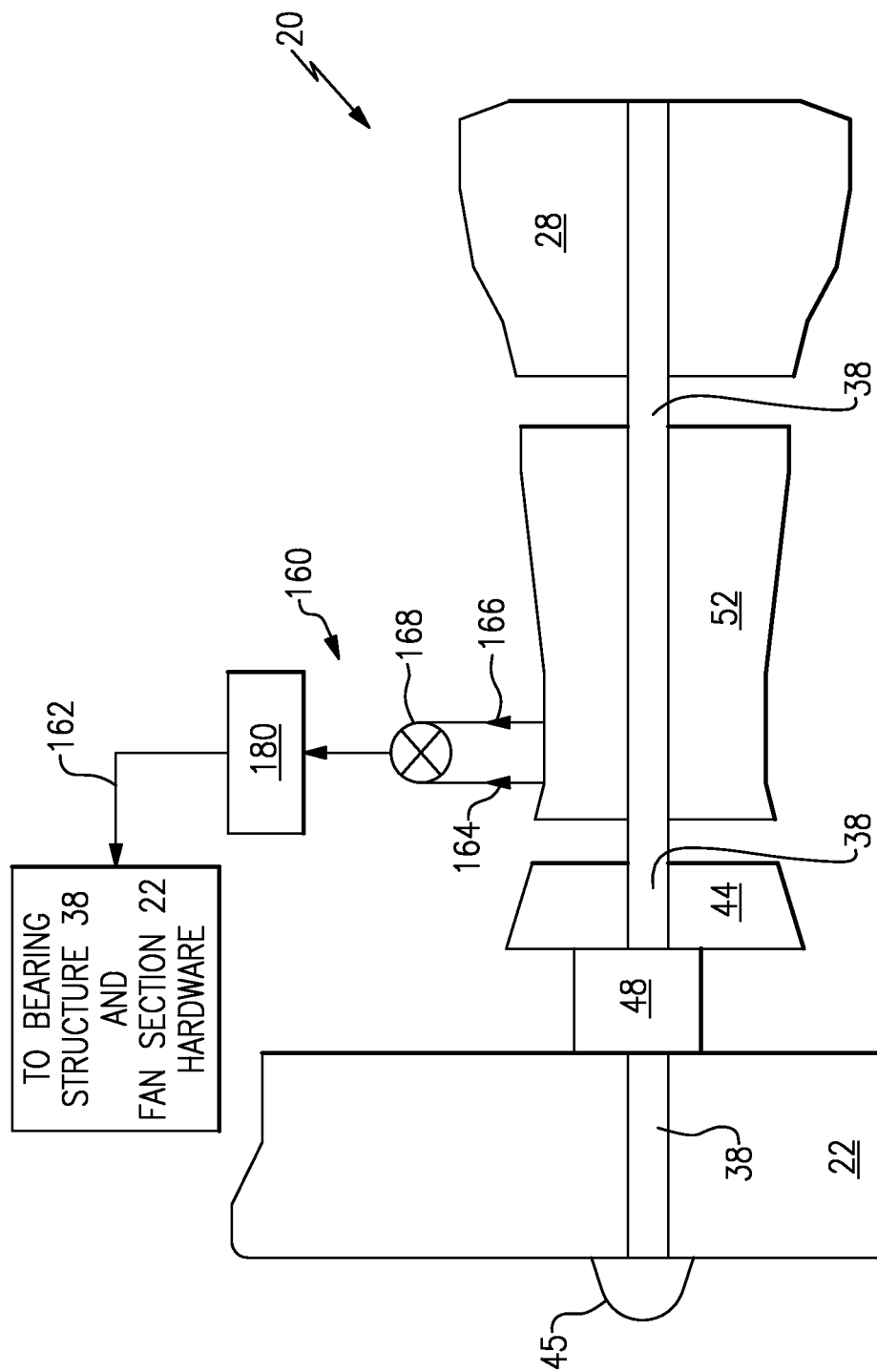
FIG. 5 is a schematic of a buffer system.

FIG. 5 illustrates another example buffer system 160 that can be incorporated into a gas turbine engine, such as the gas turbine engine 20, for pressurizing bearing compartments and anti-icing fan section 22 hardware. In this disclosure, like reference numerals indicate similar features, whereas reference numerals with an added prefix numeral of "1" indicate slightly modified features. The buffer system 160 is similar to the buffer system 60 detailed above except, in this example, the buffer system 160 is a multi-source buffer system that includes a second bleed air supply 166 in addition to a first bleed air supply 164. In the exemplary embodiment, the first bleed air supply 164 is a low pressure bleed air supply and the second bleed air supply 166 is a high pressure bleed air supply that includes a pressure that is greater than the pressure of the first bleed air supply 164. The buffer system 160 could also embody a two-zone, multi-source system that separately addresses low and high pressure requirements.

The first bleed air supply 164 can be sourced from the fan section 22, the low pressure compressor 44 or the high pressure compressor 52. In the illustrated non-limiting example, the first bleed air supply 164 is sourced from an upstream stage of the high pressure compressor 52. However, the first bleed air supply 164 could be sourced from any location that is upstream from the second bleed air supply 166. The second bleed air supply 166 can be sourced from the high pressure compressor 52, such as from a middle or downstream stage of the high pressure compressor 52. The second bleed air supply 166 could also be sourced from the low pressure compressor 44 or the fan section 22 depending on where the first bleed air supply 164 is sourced from.

The buffer system 160 can also include a valve 168 that is in communication with both the first bleed air supply 164 and the second bleed air supply 166. Although shown schematically, the first bleed air supply 164 and the second bleed air supply 166 can be in fluid communication with the valve 168 via buffer tubing, conduits, or other passageways. Check valves can also be used to prevent the second bleed air supply 164 from backflowing into the first bleed air supply 166.

The valve 168 can select between the first bleed air supply 164 and the second bleed air supply 166 to communicate a buffer supply air 162 having a desired temperature and pressure to select portions of the gas turbine engine 20, including to the fan section 22 hardware for anti-icing purposes. The valve 168 communicates either the first bleed air supply 164 or the second bleed air supply 166 to a conditioning device 180 to condition the air supply and render the buffer supply air 162.

The valve 168 can be a passive valve or a controller base valve. A passive valve operates like a pressure regulator that can switch between two or more sources without being commanded to do so by a controller, such as an engine control (EEC). The valve 168 of this example uses only a single input which is directly measured to switch between the first bleed air supply 164 and the second bleed air supply 166.

The valve 168 could also be a controller based valve. For example, the buffer system 160 could include a controller 170 in communication with the valve 168 for selecting between the first bleed air supply 164 and the second bleed air supply 166. The controller 170 is programmed with the necessary logic for selecting between the first bleed air supply 164 and the second bleed air supply 166 in response to detecting a pre-defined power condition of the gas turbine engine 20. The controller 170 could also be programmed with multiple inputs.

The determination of whether to communicate the first bleed air supply 164 or the second bleed air supply 166 as the buffer supply air 162 is based on a power condition of the gas turbine engine 20. The term "power condition" as used in this disclosure generally refers to an operability condition of the gas turbine engine 20. Gas turbine engine power conditions can include low power conditions and high power conditions. Example low power conditions include, but are not limited to, ground operation, ground idle and descent idle. Example high power conditions include, but are not limited to, takeoff, climb, and cruise conditions. It should be understood that other power conditions are also contemplated as within the scope of this disclosure.

In one exemplary embodiment, the valve 168 communicates the first bleed air supply 164 (which is a relatively lower pressure bleed air supply) to the conditioning device 180 in response to identifying a high power condition of a gas turbine engine 20. The second bleed air supply 166 (which is a relatively higher pressure bleed air supply) is selected by the valve 168 and communicated to the conditioning device 180 in response to detecting a low power condition of the gas turbine engine 20. Both sources of bleed air are intended to maintain the same minimum pressure delta across the bearing compartment seals. Low power conditions require a relatively higher stage pressure source to maintain adequate pressure differential, while high power conditions can meet requirements with a relatively lower stage pressure source. Use of the lowest possible compressor stage can to meet the pressure requirements and minimize supply temperature and any negative performance impact to the gas turbine engine 20.

The conditioning device 180 of the buffer system 160 could include a heat exchanger or an ejector. An ejector adds pressure (using a small amount of the second bleed air supply 166) to the first bleed air supply 164 to prepare the buffer supply air 162.

Although the different examples have a specific component shown in the illustrations, embodiments of this disclosure are not limited to those particular combinations. It is possible to use some of the components or features from one of the examples in combination with features or components from another one of the examples.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
   a buffer system, wherein said buffer system includes:
      a first bleed air supply;
      a conditioning device that conditions said first bleed air supply to render a buffer supply air at an acceptable temperature for pressurizing at least one bearing structure and at least a portion of anti-icing hardware of a fan section of the gas turbine engine, wherein separate buffer supply airs are communicated to said at least one bearing structure and said at least a portion of anti-icing hardware;
      a sensor configured to detect a flight condition of the gas turbine engine; and
      a controller configured to control operation of said conditioning device and command communication of said buffer supply air to said anti-icing hardware in response to detection of said flight condition,
      wherein a portion of said buffer supply air is communicated in a downstream direction to condition other portions of the gas turbine engine separate from said at least one bearing structure and said hardware.

2. The gas turbine engine as recited in claim 1, wherein said hardware includes a a spinner.

3. The gas turbine engine as recited in claim 2, wherein said buffer system communicates said buffer supply air to an interior portion of said spinner to anti-ice said spinner.

4. The gas turbine engine as recited in claim 3, comprising a passageway that communicates said buffer supply air from said buffer system to said interior portion.

5. The gas turbine engine as recited in claim 1, wherein said hardware includes a static nosecone.

6. The gas turbine engine as recited in claim 1, wherein said first bleed air supply is sourced from a stage of one of the fan section and a compressor section of the gas turbine engine.

7. The gas turbine engine as recited in claim 1, wherein said conditioning device is a heat exchanger.

8. The gas turbine engine as recited in claim 1, wherein the gas turbine engine is a geared turbofan engine.

9. The gas turbine engine as recited in claim 1, wherein said first bleed air supply is sourced from the fan section of the gas turbine engine.

10. The gas turbine engine as recited in claim 1, wherein said first bleed air supply is sourced from a high pressure compressor of the gas turbine engine.

11. The gas turbine engine as recited in claim 10, wherein said first bleed air supply is sourced from a middle stage of said high pressure compressor.

12. A gas turbine engine, comprising:
   a fan section;
   a compressor section in fluid communication with said fan section;
   a combustor in fluid communication with said compressor section;
   a turbine section in fluid communication with said combustor;
   at least one shaft that interconnects at least a portion of said compressor section and said turbine section;
   a bearing structure that supports said at least one shaft; and
   a buffer system that communicates a first buffer supply air to at least a spinner of said fan section to anti-ice said spinner and a second buffer supply air separate from said first buffer supply air to at least a portion of said bearing structure, wherein said buffer system includes a first bleed air supply, a conditioning device that conditions said first bleed air supply to render said first buffer supply air and said second buffer supply air at an acceptable temperature, a sensor configured to detect a flight condition of the gas turbine engine, and a controller configured to control operation of said conditioning device to command said second buffer supply air at an adequate differential pressure for sealing said bearing structure and configured to command communication of said first buffer supply air in response to detection of said flight condition, wherein a portion of either of said first buffer supply air and said second buffer supply air is communicated in a downstream direction to condition other portions of the gas turbine engine separate from said bearing structure and said spinner.

13. The gas turbine engine as recited in claim 12, comprising a geared architecture that drives said fan section at a lower speed than said compressor section.

14. The gas turbine engine as recited in claim 12, wherein the gas turbine engine is a high bypass geared aircraft engine having a bypass ratio of greater than six (6).

15. The gas turbine engine as recited in claim 12, wherein the gas turbine engine includes a low Fan Pressure Ratio of less than 1.45.

16. The gas turbine engine as recited in claim 12, wherein said compressor section includes a high pressure compressor that is a source of said first bleed air supply that is communicated to said buffer system.

* * * * *